United States Patent
Risch et al.

(10) Patent No.: US 6,941,049 B2
(45) Date of Patent: Sep. 6, 2005

(54) FIBER OPTIC CABLE HAVING NO RIGID STRENGTH MEMBERS AND A REDUCED COEFFICIENT OF THERMAL EXPANSION

(75) Inventors: Brian Risch, Corvallis, OR (US); Olaf Storaasli, Hickory, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/463,338

(22) Filed: Jun. 18, 2003

(65) Prior Publication Data

US 2004/0258372 A1 Dec. 23, 2004

(51) Int. Cl.$^7$ ................................................. G02B 6/44
(52) U.S. Cl. ........................................................ 385/100
(58) Field of Search ................................ 385/100, 106, 385/109, 112

(56) References Cited

U.S. PATENT DOCUMENTS

| | | | |
|---|---|---|---|
| 5,574,816 A | * 11/1996 | Yang et al. | 385/109 |
| 5,761,362 A | 6/1998 | Yang et al. | 385/109 |
| 5,911,023 A | * 6/1999 | Risch et al. | 385/100 |
| 6,041,153 A | * 3/2000 | Yang | 385/109 |
| 6,085,009 A | 7/2000 | Risch et al. | 385/109 |
| 6,198,865 B1 | 3/2001 | Risch | 385/113 |
| 6,349,161 B1 | 2/2002 | Gleason et al. | 385/113 |
| 6,707,973 B2 | * 3/2004 | Witt et al. | 385/109 |
| 2003/0099446 A1 | * 5/2003 | Witt et al. | 385/109 |

* cited by examiner

Primary Examiner—Khiem Nguyen
(74) Attorney, Agent, or Firm—Sughrue Mion, PLLC

(57) ABSTRACT

A fiber optic cable is provided with an outer jacket material having a coefficient of thermal expansion less than approximately 6E−5 in the range from 23° C. to −50° C. By utilizing an outer jacket material having a reduced coefficient of thermal expansion, the need for rigid strength members within the outer jacket is eliminated, thereby providing a fiber optic cable having a reduced size and weight.

5 Claims, 2 Drawing Sheets

FIBER OPTIC CABLE HAVING NO RIGID STRENGTH MEMBERS AND A REDUCED COEFFICIENT OF THERMAL EXPANSION

BACKGROUND OF THE INVENTION

1. Field of the Invention

The present invention relates generally to a fiber optic cable. More particularly, the present invention relates to a fiber optic cable having no rigid strength members, a reduced weight, and a reduced coefficient of thermal expansion.

2. Related Art

A conventional central tube fiber optic cable design includes rigid strength members embedded in an outer jacket of the cable. The rigid strength members are utilized for tensile strength and to prevent attenuation in the optical fibers within the cable due to thermal contraction of the cable.

While the rigid strength members are effective in reducing the thermal contraction of the cable, the use of rigid strength members introduces numerous drawbacks. For example, the presence of rigid strength members in the outer jacket significantly increases the wall thickness of the outer jacket, the overall diameter of the fiber optic cable, and the weight of the fiber optic cable.

Another drawback associated with the use of rigid strength members is that the bending performance of the fiber optic cable is significantly limited. In the traditional fiber optic cable, two rigid strength members are generally positioned so as to be diametrically opposed to one another within the outer jacket of the cable. Due to the presence of these rigid strength members, the fiber optical cable exhibits a preferential and a non-preferential bending direction. Such bending restrictions negatively affect the ease of installation of conventional fiber optic cables.

Therefore, what is needed is a fiber optic cable design that eliminates the need for rigid strength members while preventing the thermal contraction of the outer jacket material.

SUMMARY OF THE INVENTION

A fiber optic cable is provided with an outer jacket material having a coefficient of thermal expansion less than approximately 6E–5 in the range from 23° C. to –50° C. By utilizing an outer jacket material having a reduced coefficient of thermal expansion, the need for rigid strength members within the outer jacket is eliminated, thereby providing a fiber optic cable having a reduced size and weight.

The above and other features of the invention including various and novel details of construction and combination of parts will now be more fully described with reference to the accompanying drawings and pointed out in the claims. It will be understood that the particular features embodying the invention are shown by way of illustration only and not as a limitation of the invention. The principles and features of this invention may be employed in varied and numerous embodiments without departing from the scope of the invention.

BRIEF DESCRIPTION OF THE DRAWINGS

Aspects of illustrative, non-limiting embodiments of the present invention will become more apparent by describing in detail embodiments thereof with reference to the attached drawings in which.

DETAILED DESCRIPTION OF THE INVENTION

The following description of illustrative non-limiting embodiments of the invention discloses specific configurations, features, and operations. However, the embodiments are merely examples of the present invention, and thus, the specific features described below are merely used to more easily describe such embodiments and to provide an overall understanding of the present invention.

Accordingly, one skilled in the art will readily recognize that the present invention is not limited to the specific embodiments described below. Furthermore, the description of various configurations, features, and operations of the present invention that are known to one skilled in the art are omitted for the sake of clarity and brevity. Also, it is to be understood that the phraseology and terminology employed herein is for the purpose of description and should not be regarded as limiting.

Figure 1:
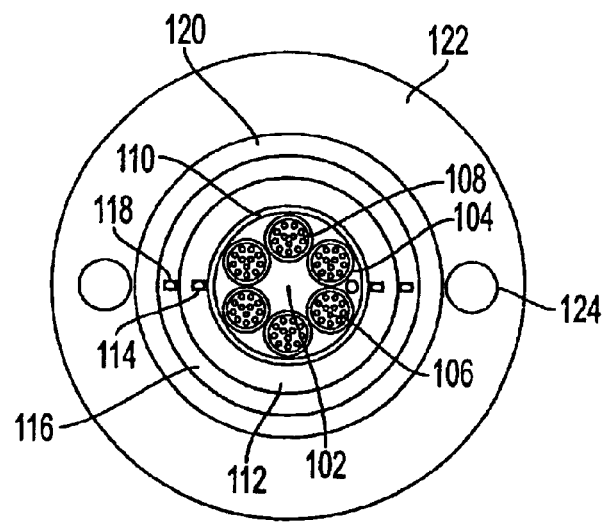
FIG. 1 is a cross-sectional view depicting a conventional fiber optic cable.

FIG. 1 shows a cross-sectional view of a conventional fiber optic cable. The cable is provided with a core having swellable yarns 102 and a plurality of buffer tubes 104. Each buffer tube 104 holds a plurality of optical fibers 106 and is filled with a filling compound 108. Buffer tubes 104 are surrounded by a water swellable tape 110 which prevents the ingress of water.

An inner tube 112 surrounds water swellable tape 110 and is provided with a rip thread 114 to allow the removal of overlying layers. Strength yarns 116 surround inner tube 112 and are provided with a ripcord 118. Surrounding strength yarns 116 is an armor layer 120 which provides added support for the cable.

Finally, an outer jacket 122 is provided having a plurality of rigid strength members 124. To accommodate rigid strength members 124, outer jacket 122 must be formed with a thickness of approximately 2.25 mm. Conventional materials utilized for outer jacket 122 include high density polyethylene (HDPE), medium density polyethylene (MDPE) and linear low density polyethylene (LLDPE).

These conventional materials have a substantially higher coefficient of thermal expansion than that of glass. Therefore, differential thermal strains are developed as a function of temperature variation. At low temperatures, the conventional outer jacketing materials contract substantially more than the glass fibers in the cable, thereby presenting a possible risk of fiber strain due to contraction and/or fiber buckling. Such strain and buckling induced on an optical fiber will result in attenuation and possible network system failure. The rigid strength members 124 are included within outer jacket 122 to limit such cable contraction at low temperatures.

Figure 2:
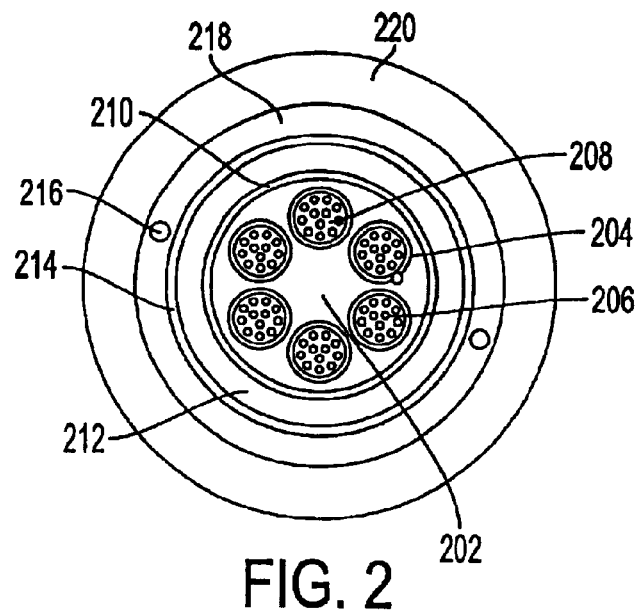
FIG. 2 is a cross-sectional view depicting a fiber optic cable according to an illustrative embodiment of the present invention.

FIG. 2 shows a fiber optic cable according to an illustrative embodiment of the present invention. The cable is provided with a core having swellable yarns 202 and a plurality of buffer tubes 204. Each buffer tube 204 holds a plurality of optical fibers 206 and is filled with a filling compound 208. Buffer tubes 204 are surrounded by a water swellable tape 210 which prevents the ingress of water.

An inner tube 212 surrounds water swellable tape 210 and strength yarns 214 which provide tensile strength for the cable surround inner tube 212. Ripcord 216 is provided which allows the removal of any overlying layers. Surrounding strength yarns 214 is an armor layer 218 which provides added support for the cable.

Finally, the cable is provided with an outer jacket 220. Outer jacket 220 is made from a material having a coefficient of thermal expansion less than approximately 6E–5 in the range from 23° C. to –50° C. An example of a material for outer jacket 220 includes, but is not limited to, a nucleated impact polypropylene having a coefficient of thermal expansion less than approximately 6E–5 in the range from 23° C. to –50° C.

By utilizing such a material, the need for rigid strength members 124 is eliminated. Instead, the outer jacket itself is able to protect the optical fibers from strain and/or buckling at low temperatures, thereby preventing attenuation and potential network system failure. In an illustrative embodiment of the present invention, the thickness of the outer jacket is approximately 1.00 mm, significantly less than the thickness required by the conventional outer jacket.

Figure 3:
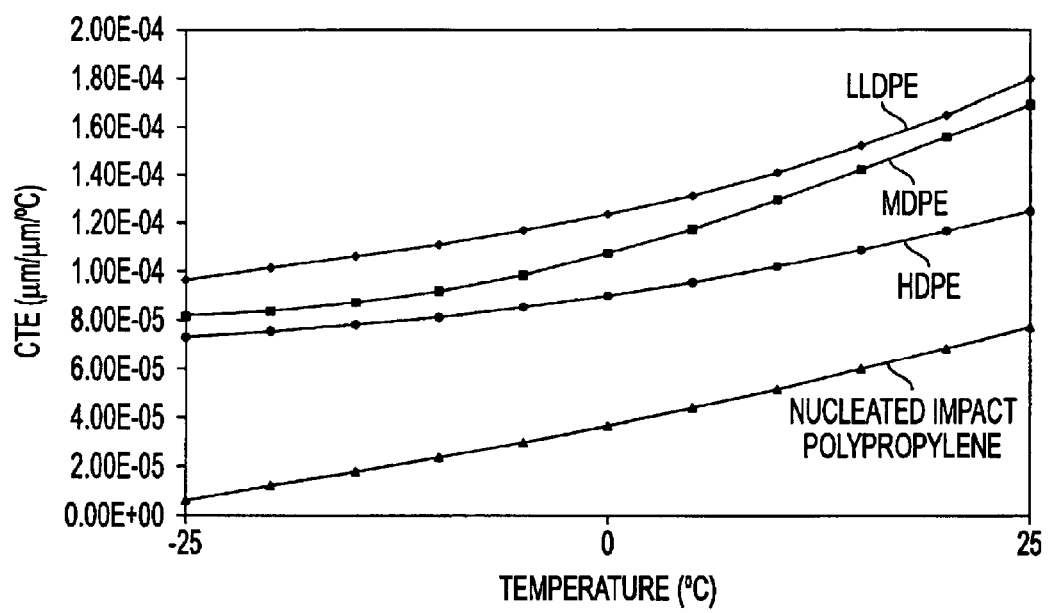
FIG. 3 is a graph depicting the coefficient of thermal expansion at different temperatures for various outer jacketing materials.

FIG. 3 is a graph depicting the coefficient of thermal expansion over a range of temperatures for nucleated impact polypropylene, high density polyethylene (HDPE), medium density polyethylene (MDPE) and linear low density polyethylene (LLDPE). As is clearly shown, nucleated impact polypropylene has an almost 90% lower coefficient of thermal expansion at –25° C. and a 60% lower coefficient of thermal expansion at 0° C. than the various polyethylene materials.

By utilizing an outer jacket material having a reduced coefficient of thermal expansion, and thereby eliminating the need for rigid strength members within the outer jacket, the fiber optic cable of the present invention is able to achieve a reduced weight, a reduced diameter, no preferential bending direction, improved installation distance during blowing or other installation, increased ease of routing in tight access network environments and reduced material usage and cost.

The present invention is not limited for use with a central tube fiber optic cable having buffer tubes. For example, the present invention may be utilized in conjunction with a loose tube cable in which tubes containing fibers are stranded around a central strength member. In addition, the present invention may be utilized in conjunction with cables having fibers or fiber bundles which float freely in the center tube, or cables having a ribbon stack in the center of the cable.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

What is claimed is:

1. A cable comprising:

an outerjacket material forming an outermost layer of the cable, said outer jacket material having a coefficient of thermal expansion less than approximately 6E–5 in the range from 23° C. to –50° C.;

at least one optical fiber surrounded by said outer jacket material; and a buffer tube containing said at least one optical fiber, wherein said outer jacket material comprises a nucleated impact polypropylene, and wherein said outer jacket material does not contain rigid strength members.

2. A cable according to claim 1, wherein said outer jacket material does not contain rigid strength members.

3. A cable according to claim 1, wherein the cable does not contain rigid strength members.

4. A cable according to claim 1, further comprising:

at least one optical fiber, wherein said at least one optical fiber is surrounded by said outer jacket material, and wherein said outer jacket material forms an outermost layer of the cable.

5. A cable, comprising:

an outer jacket material forming an outermost layer of the cable, said outer jacket material having a coefficient of thermal expansion less then approximately 6E–5 in the range from 23° C. to –50° C.;

at least one optical fiber surrounded by said outer jacket material; and a buffer tube containing said at least one optical fiber, wherein said outer jacket material comprises a nucleated impact polypropylene and wherein the cable does not contain rigid strength members.

* * * * *